(12) United States Patent
Olver et al.

(10) Patent No.: US 7,861,512 B2
(45) Date of Patent: Jan. 4, 2011

(54) TURBOFAN BYPASS DUCT AIR COOLED FLUID COOLER INSTALLATION

(75) Inventors: Bryan Olver, Nobleton (CA);
Alessandro Ciampa, Montreal (CA);
Roberto Marrano, Boucherville (CA);
Richard Trepanier, Montreal (CA);
Sylvain Lamarre, Longueuil (CA);
Martin Bernard, Boucherville (CA);
Patrick Germain, Outremont (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1017 days.

(21) Appl. No.: 11/511,419

(22) Filed: Aug. 29, 2006

(65) Prior Publication Data

US 2008/0053059 A1 Mar. 6, 2008

(51) Int. Cl.
*F02K 3/02* (2006.01)
(52) U.S. Cl. .................. 60/226.1; 60/266; 60/39.08
(58) Field of Classification Search ............... 60/226.1, 60/266, 267, 39.08, 39.83, 730
See application file for complete search history.

(56) References Cited

U.S. PATENT DOCUMENTS

| | | | |
|---|---|---|---|
| 2,474,258 A | 6/1949 | Kroon | |
| 2,696,712 A | 12/1954 | Lewis | |
| 3,000,176 A | 9/1961 | Kuhrt | |
| 3,705,496 A | 12/1972 | Wolf et al. | |
| 4,151,710 A | 5/1979 | Griffin et al. | |
| 4,254,618 A | 3/1981 | Elovic | |
| 4,782,658 A | 11/1988 | Perry | |
| 4,903,760 A | 2/1990 | Joshi et al. | |
| 4,914,904 A | 4/1990 | Parnes et al. | |
| 5,265,408 A * | 11/1993 | Sheoran et al. | ............ 60/39.08 |
| 5,269,135 A | 12/1993 | Vermejan et al. | |
| 5,284,012 A | 2/1994 | Laborie et al. | |
| 5,351,476 A | 10/1994 | Laborie et al. | |
| 5,438,823 A | 8/1995 | Loxley et al. | |
| 5,823,250 A | 10/1998 | Barten et al. | |
| 6,092,360 A | 7/2000 | Hoag et al. | |
| 6,651,929 B2 | 11/2003 | Dionne | |
| 6,931,834 B2 | 8/2005 | Jones | |
| 2006/0042225 A1 | 3/2006 | Bruno et al. | |
| 2006/0117734 A1 | 6/2006 | Larkin et al. | |
| 2008/0053060 A1 | 3/2008 | Olver | |

OTHER PUBLICATIONS

International Search Report dated Dec. 17, 2007 on Applicant's corresponding PCT International Application No. PCT/CA2007/001500.

* cited by examiner

*Primary Examiner*—Ted Kim
(74) *Attorney, Agent, or Firm*—Ogilvy Renault LLP

(57) ABSTRACT

A cooling apparatus for cooling a fluid in a bypass gas turbine engine comprises a heat exchanger disposed within a bypass duct and accommodated by a sub-passage defined by a flow divider affixed to an annular wall of the bypass duct. The sub-passage defines an open upstream end and an open downstream end to direct a portion of the bypass air flow to pass therethrough.

6 Claims, 5 Drawing Sheets

TURBOFAN BYPASS DUCT AIR COOLED FLUID COOLER INSTALLATION

TECHNICAL FIELD

The invention relates generally to gas turbine engines and more particularly, to an improved cooling apparatus for cooling of a fluid used in a turbofan bypass gas turbine engine.

BACKGROUND OF THE INVENTION

Lubricating oil used in aircraft gas turbine engines must be cooled. Without proper cooling, poor cooling and/or poor lubrication of gears and bearings result, which may cause problems for engine operation. In addition to employing conventional radiator-type oil coolers, the prior art also describes directing oil through inlet guide vanes or support struts to achieve a cooling benefit from air ingested by the engine. The cooling of engine fluid is also achieved by directing the fluid flowing directly along a surface defining a periphery of a bypass duct of a turbofan bypass gas turbine engine, to thereby permit heat exchange between the fluid and bypass air passing through the bypass duct. However, efforts have been made to further improve the cooling of lubricating fluids of gas turbine engines.

Accordingly, there is a need to provide an improved cooling apparatus for use in gas turbine engines, particularly in turbofan bypass gas turbine engines.

SUMMARY OF THE INVENTION

It is therefore an object of this invention to provide a cooling apparatus for cooling of fluid used in a gas turbine engine.

In one aspect, the present invention provides a cooling apparatus for cooling a fluid in a bypass gas turbine engine, which comprises a heat exchanger defining a fluid passage, the heat exchanger being disposed within a bypass duct and being exposed to a bypass air flow; and a flow divider affixed to an annular wall of the bypass duct, in combination with the wall of the bypass duct forming a sub-passage for accommodating the heat exchanger, the sub-passage defining an open upstream end and an open downstream end to direct a portion of the bypass air flow to pass therethrough In another aspect, the present invention provides a gas turbine engine which comprises a core engine; a bypass duct surrounding the core engine and adapted to direct a bypass air flow through the bypass duct; a heat exchanger defining a fluid passage, the heat exchanger being disposed within the bypass duct and being exposed to the bypass air flow; and means for increasing a local pressure differential of the bypass air flow between upstream and downstream locations with respect to the heat exchanger in order to facilitate heat exchange between the heat exchanger and the air flow.

In another aspect, the present invention provides a method of installing a fluid cooling apparatus in a gas turbine engine, which comprises: 1) placing a heat exchanger into a bypass duct through an open area of an outer annular wall of the bypass duct and positioning the heat exchanger in a sub-passage defined within the bypass duct; and 2) closing the open area of the outer wall of the bypass duct, the heat exchanger being connectable to a fluid circuit of the engine.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
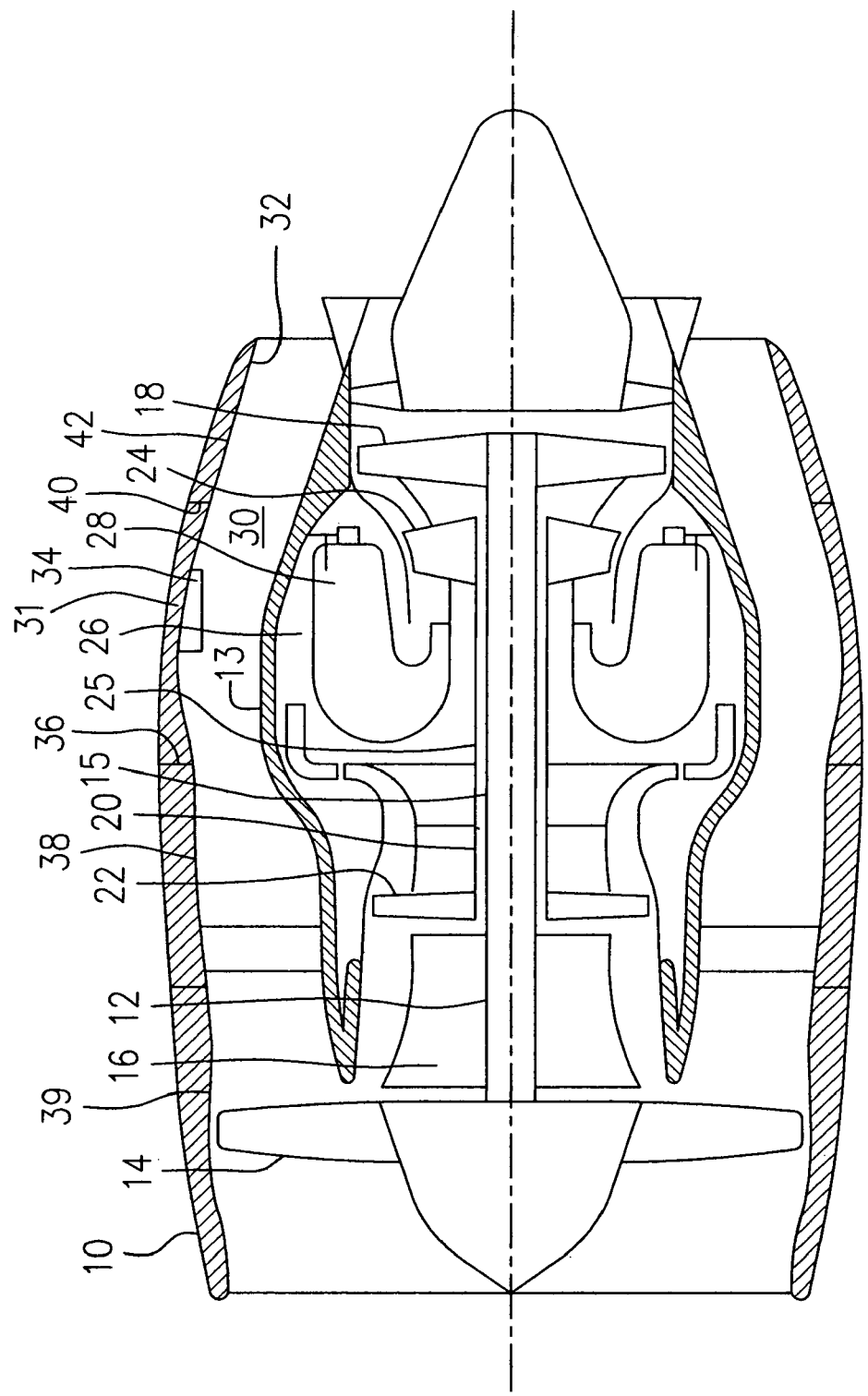
FIG. 1 is a schematic cross-sectional view of a turbofan bypass gas turbine engine, showing an exemplary application of a fluid cooling apparatus.

FIG. 1 illustrates a turbofan bypass gas turbine engine which includes a housing 10, a core casing 13, a low pressure spool assembly seen generally at 12 which includes a shaft 15 interconnecting a fan assembly 14, a low pressure compressor 16 and a low pressure turbine assembly 18, and a high pressure spool assembly seen generally at 20 which includes a shaft 25 interconnecting a high pressure compressor assembly 22 and a high pressure turbine assembly 24. The core casing 13 surrounds the low and high pressure spool assemblies 12 and 20 to define a main fluid path (not indicated) through the engine. In the main fluid path there is provided a combustion section 26 having a combustor 28 therein. An annular bypass duct 30 is defined between an inner bypass duct wall, formed for example by the core casing 13, and an outer bypass duct wall 32 formed by an outer bypass duct casing located within the housing 10. A stream of bypass air which is compressed by the fan assembly 14, is directed through the annular bypass duct 30 and is discharged therefrom to produce thrust.

The engine has a lubricating system (not indicated) including a pump (not shown) and a heat exchanger 34 positioned within the annular bypass duct 30, according to one embodiment of the present invention. The heat exchanger 34 is connected in fluid communication with a fluid circuit (not shown) such as a lubricating system of the engine, to allow relatively hot oil to flow therethrough and be thereby cooled by a fast moving stream of bypass air passing through the annular bypass duct 30.

Referring to FIGS. 1-5 and in accordance with an embodiment of the present invention, a section of the outer bypass duct wall 32 is defined by an outer bypass duct casing or annular body 31, preferably made of sheet metal or other suitable material. The front end of the annular body 31 has an opening with a radially extending flange 36 to be connected to an intermediate casing 38 (see FIG. 1) which in turn is connected to a fan casing 39. The rear end of the annular body 31 has a radially outwardly extending flange 40 to be connected with an engine exhaust duct 42 (see FIG. 1).

Figure 3:
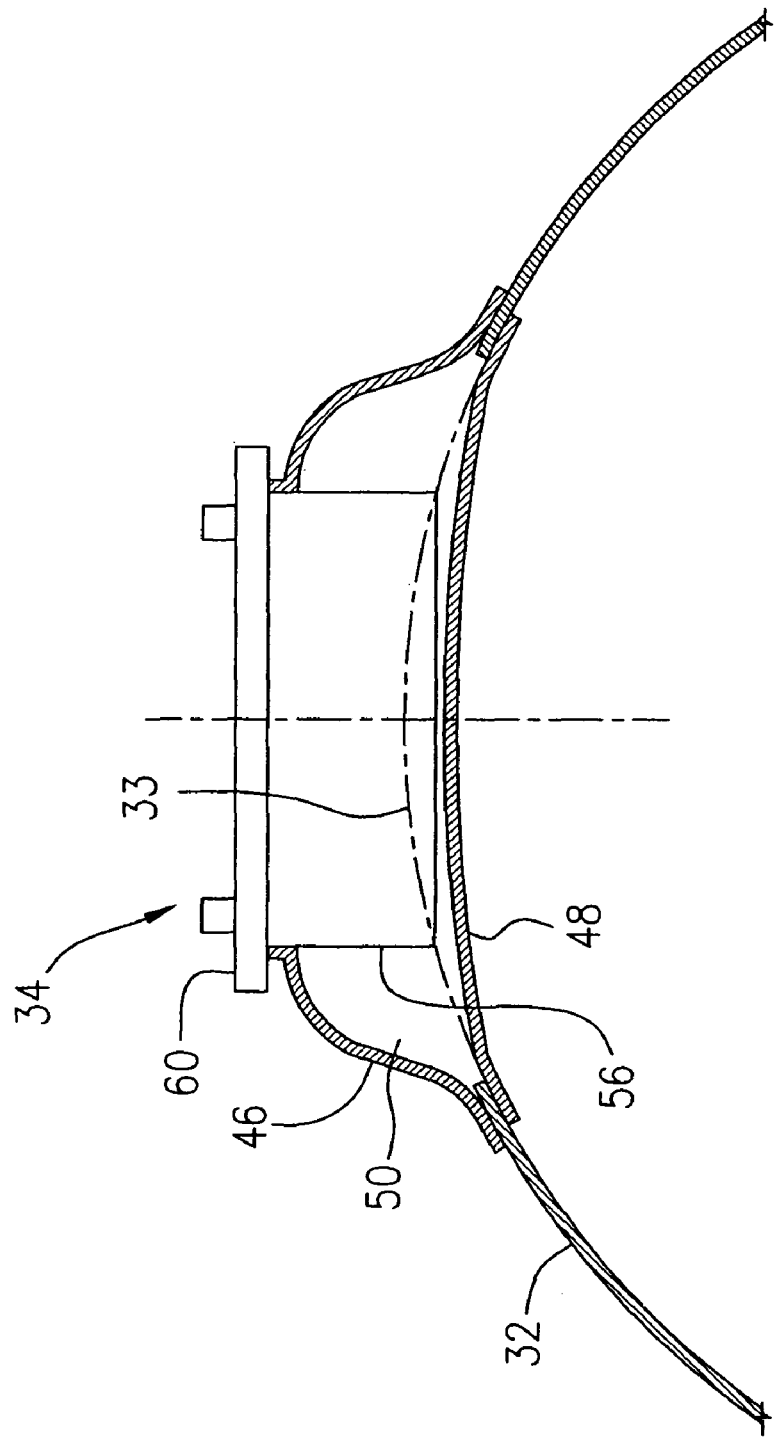
FIG. 3 is a partial cross-sectional view taken along line 3-3 of FIG. 2, showing a traverse section of the sub-passage defined by the fluid divider.
Figure 4:
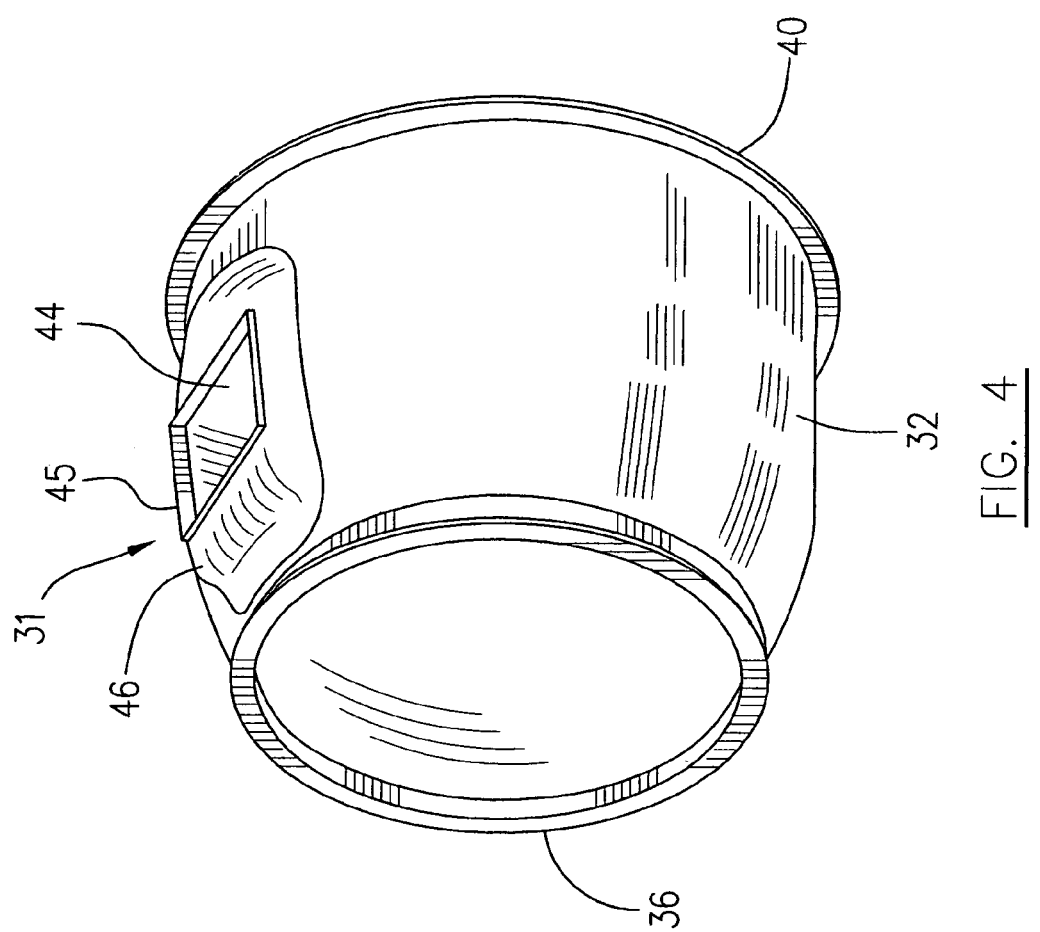
FIG. 4 is an isometric view of the outer bypass casing of the turbofan engine of FIG. 1.
Figure 5:
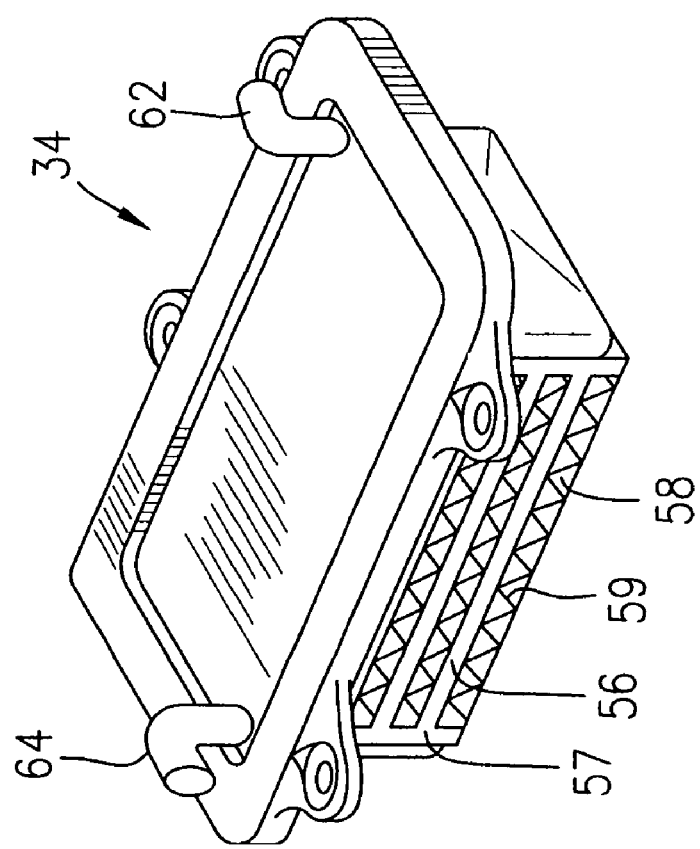
FIG. 5 is an isometric view of an exemplary embodiment of a heat exchanger of the fluid cooling apparatus of FIG. 1.

The annular body 31 has an open area 44, for example in a rectangular shape, as shown in FIG. 3. The open area 44 is preferably defined in a portion 46 of the outer annular wall 32 of the bypass duct 30 which is radially outwardly protuberant relative to the remaining portion of the annular body 31, for reasons discussed further below. The protuberant portion 46 may be integrated with the remaining portion of the outer annular wall 32. However, in this embodiment, the protuberant portion 46 is fabricated in a process separate from the manufacturing of the remaining portion of the annular outer wall 32, and is then attached, for example by welding, to the remaining portion of the outer annular wall 32. The protuberant portion 46 of the outer annular wall 32 preferably includes outwardly extending flanges 45 along the edge of the rectangular open area 44. Preferably, the protuberant portion 46 flares outwardly around the rectangular open area 44 to provide the flanges 45.

Figure 2:
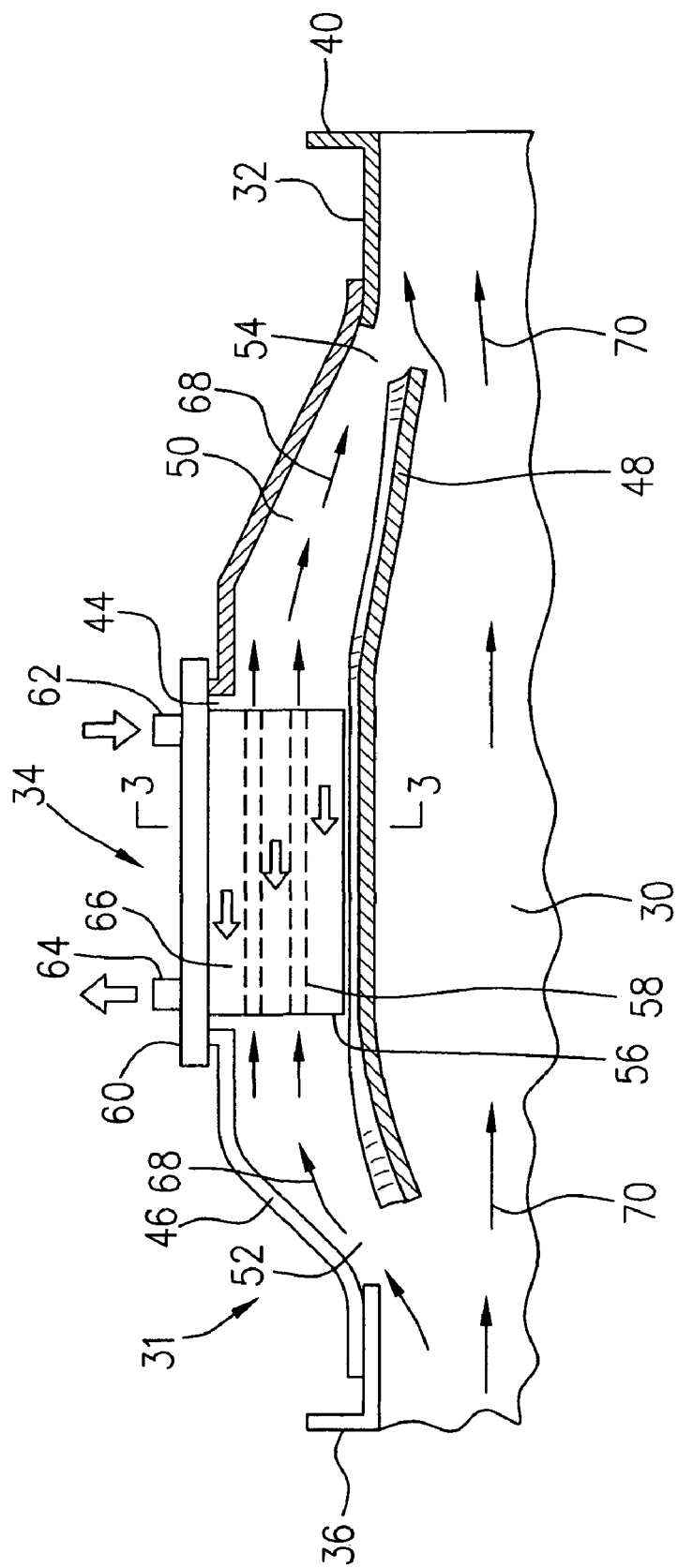
FIG. 2 is a partial cross-sectional view of the fluid cooling apparatus of FIG. 1.

A fluid divider 48 which is preferably made of a metal plate pressed in a smoothly curved aerodynamic configuration as shown in FIG. 2, is affixed, for example by welding, to the inner side of the outer annular wall 32 of the bypass duct 30, preferably in a location adjacent the protuberant portion 46. The fluid divider 48, in combination with the outer annular wall 32 of the bypass duct 30, particularly the protuberant portion 46 thereof, thereby forms a flow sub-passage 50 within the bypass duct 32. The flow sub-passage 50 defines an upstream open end 52 and a downstream open end 54 and is accessible from outside of the annular body 31 (the outer bypass duct casing) through the open area 44. The fluid divider 48, together with protuberant portion 46, provides an inlet scoop function, projecting partially into the bypass flow, and an outlet venturi function for to develop the required pressure differential needed to drive air through the cooler.

The protuberant portion 46 forms an additional space which is added to the annular bypass duct 30 to receive the heat exchanger 34. Therefore, the heat exchanger 34 is almost buried within the additional space to not substantially intrude into the annular bypass duct 30. The fluid divider 48 is smoothly curved in a configuration such that the slightly inwardly extending front and rear portions of the fluid divider 48, in combination with the protuberant portion 46, form the upstream and downstream open ends 52, 54 within the annular bypass duct 30 near the outer annular wall 32 (see FIG. 2), while the middle portion of the fluid divider 48 is shaped and positioned preferably in a close relationship with an outer duct diameter 33 (see FIG. 3).

The heat exchanger 34 can be selected from a variety of configurations. For example, coil tubes (not shown) are arranged in a sinusoidal pattern to define a fluid passage which is exposed to and is thus cooled by air flow passing through spaces between the coil tubes. The heat exchanger 34, however, according to this embodiment and illustrated in FIGS. 2-5, is configured with a plurality of tubes 56, preferably made of sheet metal or other suitable material. Metal is preferred in order to provide good heat transfer properties. Each tube 56 extends transversely and reverses at opposite sides to form a layer preferably in a rectangular configuration. Each layer (3 layers in this embodiment) of the tubes 56 are in fluid communication by vertical tubes 57 at the corners of the rectangular configuration. The rectangular configuration is sized to be received within the flow sub-passage 50 through the open area 44 of the outer annular wall 32 of the bypass duct 30. A plurality of corrugated metal sheets 59 and metal fins (not shown) are preferably placed between and contact the layers of tubes 56 to increase heat exchange surfaces. The corrugated metal sheets 59 thus define a plurality of air passages 58 extending through the heat exchanger 34.

An over-sized cover plate 60 is preferably attached to the top layer of tubes 56. The cover plate 60 includes a fluid inlet 62 and a fluid outlet 64 which are in fluid communication with the tubes 56, thereby defining at least one fluid passage 66 through the heat exchanger 34, as illustrated by the hollow arrows in FIG. 2. Preferably, the inlet and outlet are arranged such that flow through the fluid passage 66 is in the opposite direction to the bypass flow through the device, to improve heat transfer. A small tank (shown in FIG. 5 but not indicated) is preferably attached to the heat exchanger 34 at each of the opposite sides thereof in fluid communication with and as a part of the fluid passage 66.

The inlet and outlet 62, 64 extend out of the outer side of the cover plate 60 for connection to a fluid circuit, for example the lubricating system of the engine. The cover plate 60 is shaped and sized so as mate with the outwardly extending flanges 45 on the edge of the open area 44, to seal the open area 44. A plurality of mounting holes (not indicated) are preferably provided in the cover plate 60 to permit mounting screws or bolts (not shown) to pass therethrough in order to mount the cover plate 60, together with the heat exchanger 34, to the outer annular wall 32 of the bypass duct 30. The cover plate 60 functions not only as a cover for the open area 44 of the outer annular wall 32 of the bypass duct 30, but also as a base support of the heat exchanger 34 when placed in position within the bypass duct 30.

The heat exchanger 34 can be installed within the bypass duct 30 and positioned in the flow sub-passage 50 with the following installation procedure. From outside the bypass duct, the heat exchanger 34 is inserted into the open area 44 until the open area 44 is covered by the cover plate 60. The cover plate 60 is securely connected to the annular body 31 by the mounting screws or bolts, and thus securely supports the heat exchanger 34 in position within sub-passage 50. Preferably after the heat exchanger 44 is securely supported in position, the flow inlet and outlet 62, 64 can be connected to the suitable fluid circuit of the engine. The simplicity of installation and removal of the heat exchanger 34 provided by positioning the heat exchanger on the outer bypass duct and permitting it to be installed from outside the outer bypass, reduces maintenance and inspection time and thus operation costs thereof because further disassembly of the engine and/ or complicated tools are not required. The device thus may be a line replaceable unit (LRU) which can be removed and/or placed without engine removal from its operational setting (e.g. "on the wing").

During engine operation, a portion of bypass air flow indicated by arrows 68 is divided from the main bypass air flow 70 at the upstream open end 52 of the flow sub-passage 50 because the upstream open end 52 is located within the annular bypass duct 30, performing a "scoop" function. The portion of bypass air flow 68 is directed along the flow sub-passage 50 and passes through the heat exchanger 34 to be discharged from the downstream open end 54 into the main bypass air flow 70 through a venturi section, as described further below. The engine fluid such as oil for lubrication is directed to flow through the fluid passage 66 defined within the container 56, from the inlet 62 to the outlet 64. Therefore, the relatively hot oil contacts the inner surface of the container walls and surrounds the air tubes 58. Meanwhile, the portion of bypass air flow 68 passing through the heat exchanger 34, which is much cooler than the hot oil, passes along the side walls of the container 56 and through the air tubes 58, thereby causing heat exchange between the hot oil and the rapid bypass air flow 68, through the metal walls of the container 56 and the plurality of metal air tubes 58. Heat is also added to the diverted air, thereby reducing the already negligible performance loss introduced by the present device to the overall gas turbine system.

At the downstream open end 56 of the flow sub-passage 50, the portion of bypass air flow 68 is discharged back into the main bypass air flow 70. The shape of the sub-passage 50, as defined by the protuberant portion 46, together with the velocity of the main bypass air flow 70, creates a venturi effect at the downstream open end 54 of the flow sub-passage 50 to cause a local low pressure area such that the pressure differential between the upstream open end 52 and the downstream open end 54 of the flow sub-passage 50 is increased. This increased pressure differential over the flow sub-passage 50 facilitates air flow through sub-passage 50, and thereby improves the heat exchange between the portion of the bypass air flow 68 and the heat exchanger 34 (and thus the hot fluid passing therethrough).

As described, the heat exchanger 34 is almost buried in the additional space defined by the protuberant portion 46 and does not substantially intrude into the annular bypass duct 30, and more particularly, the middle section of the fluid divider 48 is in a close relationship with the outer diameter 33 of the bypass duct 30. The bypass duct main flow 70 is not significantly interfered with by the installation of the cooling apparatus of this invention.

A further advantage of this invention is lack of ducting which additionally reduces size, weight and pressure loss of the engine.

The above description is meant to be exemplary only, and one skilled in the art will recognize that changes may be made to the embodiments described without departure from the scope of the invention disclosed. For example, the heat exchanger can be otherwise configured as an air cooled fluid cooler of any suitable type, and need not be the above-described radiator type and the illustrated container type. The cooling apparatus of the present invention can be used as an air cooled oil cooler of a gas turbine engine, but also can be used to cool other fluids such as fuel or hydraulic fluids of the gas turbine engine. Although the flow sub-passage is defined between a flow divider and a portion of the outer annular wall of the bypass duct, particularly for convenience of installation, the cooling apparatus of the present invention can be positioned within the bypass duct in combination with an inner annular wall of the bypass duct. Alternately, a cooling apparatus according to the above teachings may be positioned in any suitable configuration so as to communicate with the by pass flow, such as within a strut, fairing, etc. Still other modifications which fall within the scope of the present invention will be apparent to those skilled in the art in light of a review of this disclosure, and such modifications are intended to fall within the appended claims.

The invention claimed is:

1. A cooling apparatus for cooling a fluid in a bypass gas turbine engine, the apparatus comprising:
  a heat exchanger defining a fluid passage, the heat exchanger being disposed within an opening in an annular outer wall defining an outer periphery of a bypass duct, the heat exchanger being attached to the outer wall and protruding radially into the bypass duct;
  a flow divider extending radially into the bypass duct and affixed to the outer wall of the bypass duct, the flow divider in combination with the wall of the bypass duct forming a sub-passage for communicating bypass air from the bypass duct to the heat exchanger, the sub-passage defining an open upstream end and an open downstream end each extending into the bypass duct to direct a portion of the bypass air flow to pass therethrough;
  wherein the heat exchanger comprises a cover plate affixed therewith, the cover plate being removeably attached to the outer wall of the bypass duct in order to close the open area thereof and support the heat exchanger in position; and
  wherein the heat exchanger comprises an inlet and an outlet in fluid communication with the fluid passage defined therein, the inlet and outlet extending out of an outer side of the cover plate.

2. The apparatus as defined in claim 1 wherein the outer wall of the bypass duct comprises a portion thereof adjacent the open area, which is radially outwardly spaced apart from a general circumference of the outer wall to form a space for accommodating the heat exchanger.

3. The apparatus as defined in claim 1 wherein the heat exchanger defines an air passage to allow heat exchange between air flowing therethrough and a fluid flowing through the fluid passage.

4. A gas turbine engine comprising:
  a core engine;
  a bypass duct surrounding the core engine and adapted to direct a bypass air flow through the bypass duct;
  a heat exchanger defining a fluid passage, the heat exchanger protruding through an open area in an annular outer wall of the bypass duct radially into the bypass duct and being exposed to the bypass air flow, the heat exchanger being attached to the outer wall of the bypass duct;
  a venturi throat extending into the bypass duct and communicating with the heat exchanger to cause a portion of the bypass air flow which passes through the heat exchanger to exhaust to the bypass duct downstream of the heat exchanger; and
  wherein the heat exchanger comprises a cover plate affixed thereto, the cover plate being removeably attached to the outer wall of the bypass duct configured to close the open area, an inlet and an outlet in fluid communication with the fluid passage of the heat exchanger extending out of an outer side of the cover plate.

5. The gas turbine engine as defined in claim 4 wherein the venturi throat comprises a flow divider extending inwardly of the annular outer wall of the bypass duct to direct a portion of the bypass air flow to the heat exchanger.

6. The gas turbine engine as defined in claim 4 wherein the open area is rectilinear.

* * * * *